J. FORBES, Jr.
DEVICES FOR CATCHING WATER FOWLS.

No. 182,428. Patented Sept. 19, 1876.

WITNESSES
INVENTOR.
ATTORNEYS.

UNITED STATES PATENT OFFICE.

JOHN FORBES, JR., OF PLAINWELL, MICHIGAN.

IMPROVEMENT IN DEVICES FOR CATCHING WATER-FOWLS.

Specification forming part of Letters Patent No. 182,428, dated September 19, 1876; application filed August 12, 1876.

*To all whom it may concern:*

Be it known that I, JOHN FORBES, Jr., of Plainwell, in the county of Allegan and State of Michigan, have invented a new and valuable Improvement in Devices for Catching Water-Fowls; and I do hereby declare that the following is a full, clear, and exact description of the construction and operation of the same, reference being had to the annexed drawings, making a part of this specification, and to the letters and figures of reference marked thereon.

Figure 1:
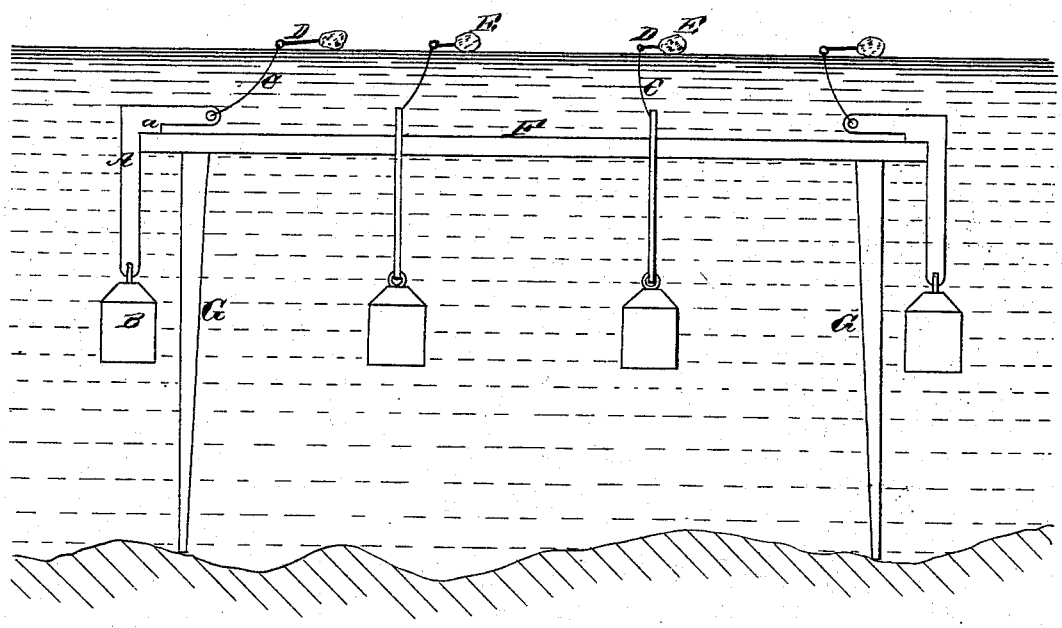
Figure 2:
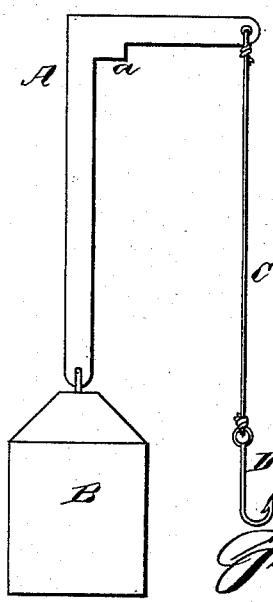

Figure 1 of the drawings is a representation of my device for catching water-fowl as applied, and Fig. 2 is a side view of the same.

This invention consists in a device for catching water-fowl and causing them to disappear under the surface of the water, substantially as hereinafter particularly set forth.

In the annexed drawings, A indicates a metal plate or catch, shaped like a carpenter's try-square, and provided with a rectangular shoulder, a, on the under side of its horizontal arm, and close to its inner angle. To one arm (the longer and vertical one) of said catch is hung a weight, B, and to the other end is secured a cord or line, C, of any suitable material, to which is attached a fish-hook, D, and bait E.

Instead of a hook, any ordinary form of trap or snare may be substituted which is suited to the purpose of catching water-fowls.

The practical application and operation of my device are as follows: I first prepare a platform or table, F, supported on legs G, and place the same in the water, with said legs resting upon the bottom, at some place frequented by ducks or other water-fowl. Square or catch A is then placed on the edge of said platform, with shoulder a resting thereon, and the vertical weighted arm of said catch or square hanging toward or in the water below. The hook and line (or snare and cord) then lie upon the surface of said platform. When a duck or other water-fowl is caught upon the hook or entangled in the snare, as the case may be, its first movement in carrying off the bait will suffice to free the said catch or square A from the said platform. Weight B will then jerk said square and line, with the water-fowl attached, under the surface of the water and hold them there. This is effected so quickly that it will not alarm the remainder of the flock. A great number may thus be caught by a single setting of hooks or snares.

If preferred, the said hooks or snares may be attached to corks or other light bodies which float upon the surface of the water, and the form and material of catch or square A may be considerably varied without departing from the spirit of my invention.

This invention may be applied to catching any kind of game on land as well as on water. For instance, the catch A may be hung upon the limb of a tree, and a sufficiently heavy weight, B, may be attached to raise even a large animal off from its feet when said catch is detached; or said invention may be arranged in a stream or other water where animals or other game come to drink, so that, as already described, the weight B may jerk them under the water and hold them there; but the main object of my invention is to catch water-fowl, as already described, and I prefer the precise construction shown.

What I claim as new, and desire to secure by Letters Patent, is—

1. A detachable catch, from which a weight is suspended, and a hook or other means of catching game, in combination with a suitable support, and operating substantially as and for the purpose set forth.

2. The catch or square A, in combination with weight B, line C, and hook D, or its equivalent, substantially as and for the purpose set forth.

3. The combination of angular catch A, having shoulder a, with weight B, line C, and hook D, substantially as and for the purpose set forth.

In testimony that I claim the above I have hereunto subscribed my name in the presence of two witnesses.

JOHN FORBES, JR.

Witnesses:
EDDY SHERMAN,
WM. E. FORBES.